United States Patent [19]

Shu

[11] Patent Number: 4,681,083

[45] Date of Patent: Jul. 21, 1987

[54] PORTABLE COOKING, TOASTING, ROASTING, AND CARBONADO HEATING DEVICE

[75] Inventor: Brandon Shu, Taipei, Taiwan

[73] Assignee: High Brandon Incorporated, Taipei, Taiwan

[21] Appl. No.: 882,395

[22] Filed: Jul. 7, 1986

[51] Int. Cl.⁴ ............................................. F24C 1/16
[52] U.S. Cl. ................................. 126/9 R; 126/25 R; 126/38; 126/41 R; 99/447
[58] Field of Search ...................... 126/9 B, 9 R, 25 R, 126/38, 41 R, 39 R, 39 J, 29, 37 B; 99/447, 448, 449, 450

[56] References Cited

U.S. PATENT DOCUMENTS

| | | | |
|---|---|---|---|
| 1,518,713 | 12/1924 | Trow | 126/38 |
| 2,742,893 | 4/1956 | Keffer | 126/38 |
| 3,062,127 | 11/1962 | Lang | 126/38 |
| 3,714,938 | 2/1973 | Spotts | 126/38 |
| 4,446,846 | 5/1984 | Hahn | 126/25 R |
| 4,492,215 | 1/1985 | DiGianvittorio | 126/25 R |
| 4,548,192 | 10/1985 | Hsu | 126/25 R |

Primary Examiner—James C. Yeung
Attorney, Agent, or Firm—Cushman, Darby & Cushman

[57] ABSTRACT

A portable cooking, toasting, roasting, and carbonado heating device, profiled like a chest, has a heating compartment for cooking, toasting, roasting and carbonado barbecue preparation, and a portably structured oven in which the heating compartment is accommodated. The heating compartment in fact is a fuel source divided into two paths by a throttle valve control, one path feeding to a carbonado unit, the other path feeding to the cooking unit, complete with a throttle valve whereby the flow of the fuel gas is controlled. The portable oven is structured like a chest oven complete with a side lid on either side and an oven cover. The oven accommodates a roast coulisse and a terrace plus two grills wherein the heating unit is situated. The whole device is easily portable by hand, is compact sized, and offers a variety of options such as cooking, toasting, roasting and carbonado barbecuing.

1 Claim, 9 Drawing Figures

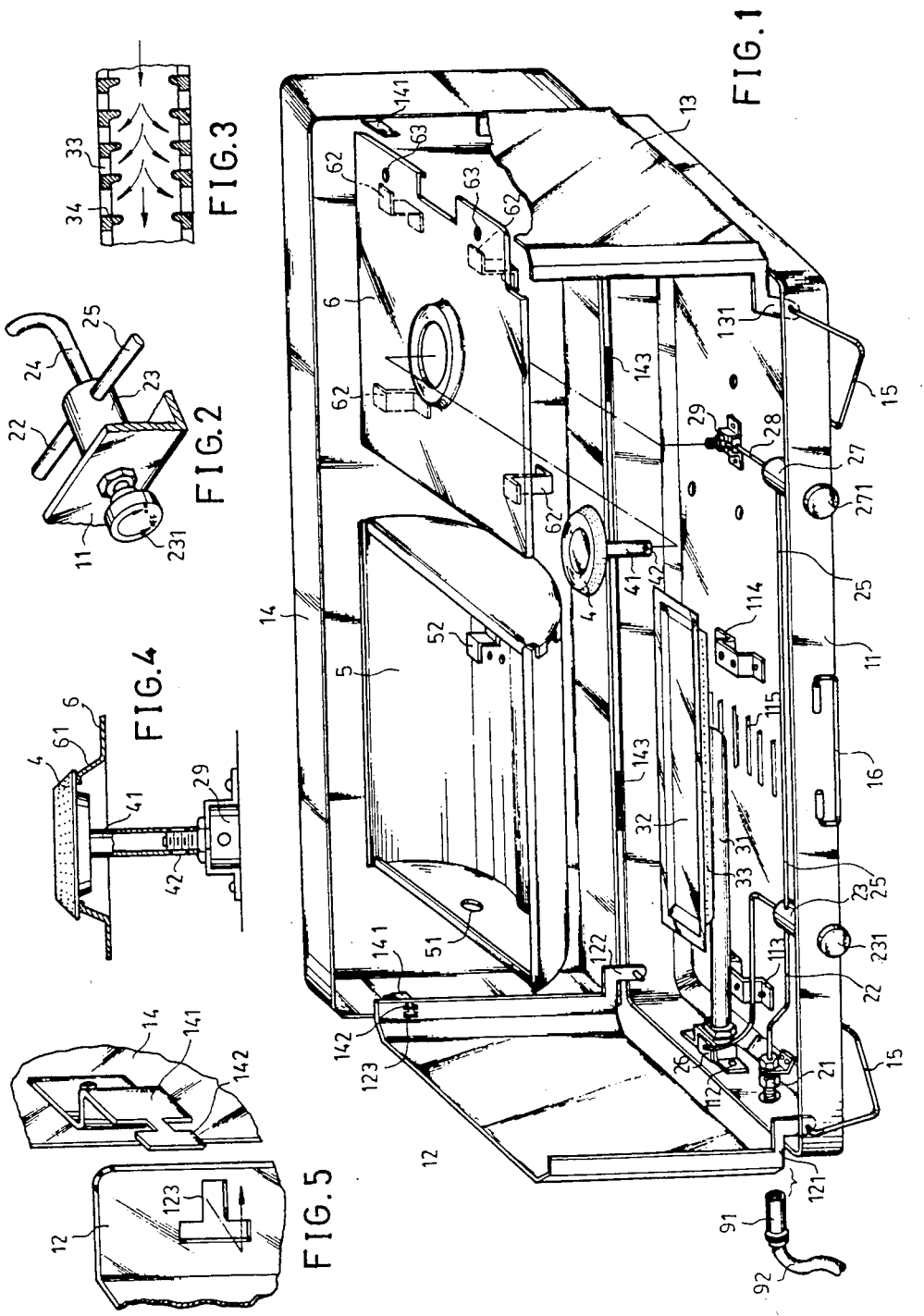

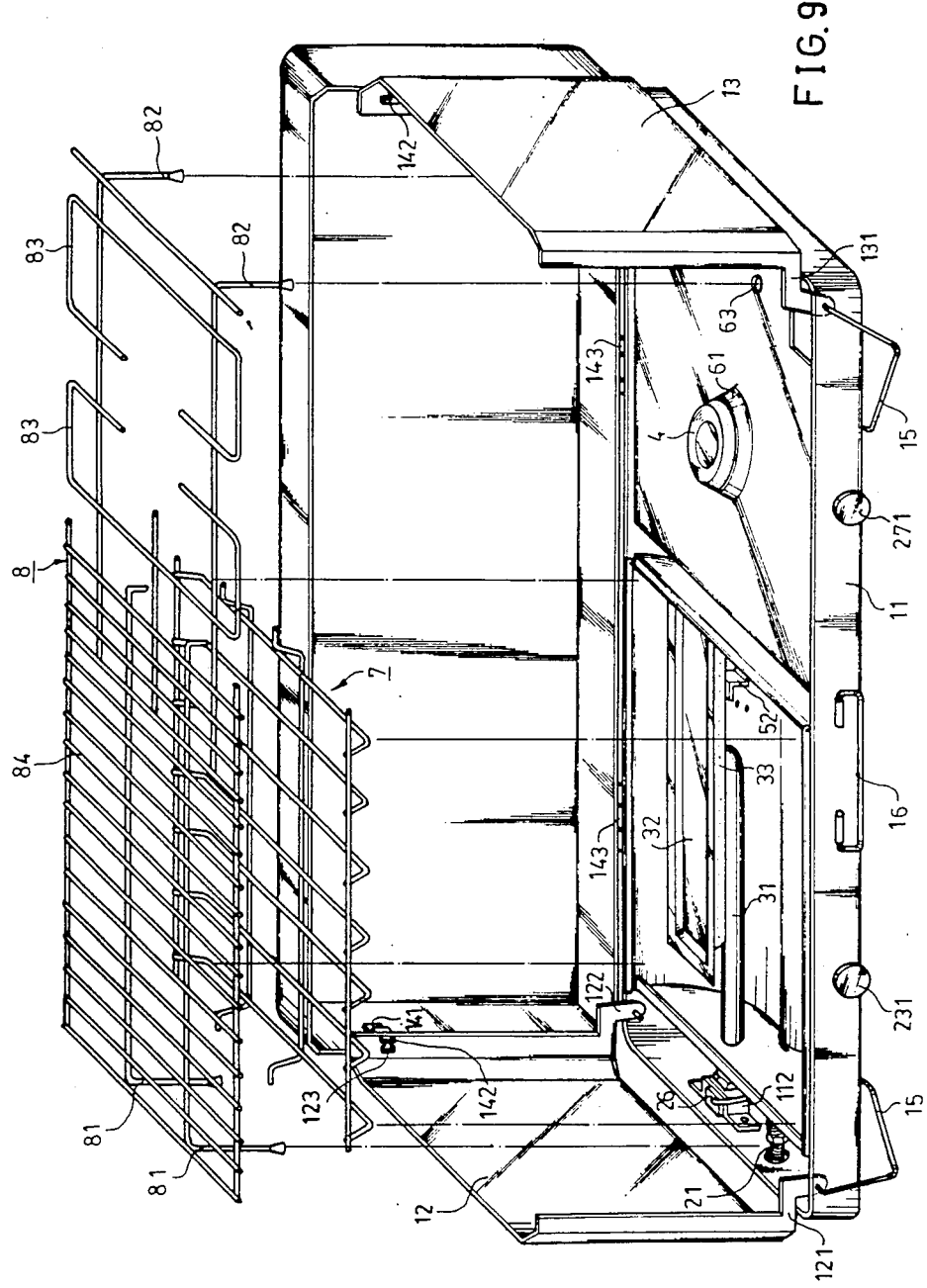

PORTABLE COOKING, TOASTING, ROASTING, AND CARBONADO HEATING DEVICE

BACKGROUND OF THE INVENTION

1. Field of the Invention

The present invention relates to the structure of a portable cooking, toasting, roasting, and carbonado heating device, which comprises essentially a composite toasting and cooking heating compartment, and a portable chest oven into which the heating compartment is accommodated. The invention offers a multiple of advantages over conventional products, including: firstly, ease of assemblage and ease of portage. Therefore, it is very convenient to carry along in an outing or camp activities out in the fields; secondly, rendering possible a variety of options for culinary presentations such as ordinary cooking, toasting, roasting, and carbonado barbecue, to suit different appetites; thirdly, compact size to save space requirements; and fourthly, ease of maintenance, servicing and ease of use.

2. Description of the Related Art

In our society, and largely speaking in democratic nations everywhere, people have lived much better than they did sometime ago. Thus, they have more leisure time to spend than was once the case, so they are more and more concerned about leisure life and touring, indeed pleasure-seeking outdoor activities, and as such they are no less worried about the cooking untensils to be carried along in an outing. With this background and with a view to meet this requirement, proposals have been made to provide cookers which are reasonably easy to carry along and which can serve to prepare foods of any different style in terms of the art of cooking, thereby affording more fun and pleasure to people out in the field for fun in groups. A review of out-cooking utensils available in the market will convince you that they are, as a rule, composed typically of a combustor, namely, the beak of a gas oven, of a footing underneath, to which the fuel is supplied by a gas source, such as a gas cylinder; or else in the form of a charcoal burner, with grill or roast grids mounted thereon to facilitate the cooking, roasting, or carbonado preparation of foods. In the market, there has been still another handy oven of the gas heating type, but this latter oven fails to provide multiple cooking performances such as regular cooking, toasting, roasting, and carbonado barbecuing. There has been provided still another kind of gas oven, which comprises two separated compartments, the compartment ahead of the oven is used for toast and carbonado treatments, while the aft compartment is used for cooking and regular boiling treatments, each compartment using one specific gas source, so that you can perform toast or carbonado cooking on one side only, and will have to rely on the other side for regular cooking and boiling services. In other words, this prior art device fails to accommodate different cooking options on any single side, and involves the provision of two gas outlets, which are therefore neither economically advantageous nor space-saving.

SUMMARY OF THE INVENTION

On understanding the above-mentioned background, therefore, one will realise that the prime objective of the present invention is to provide the structure of a portable cooking, toasting, roasting, and carbonado barbecuing device. An oven as provided, being light-weight and easily portable, may accommodate the heating compartment, for easy carriage as you move from one place to another. The device is in the meantime so compact that it permits easy carriage in a vehicle, and therefore is best recommended for use as a cooker for people intending to dine outdoors in an open field on an outing, on a camping activity, bivouac, or else just as suitable for dining purposes in the backyard, a courtyard, or a patio in the household.

A further object of the present invention is to provide the structure of a portable cooking, toasting, roasting, and carbonado barbecue heating device, which makes possible the execution of a variety of cooking styles, for example, regular cooking, toasting, roasting and carbonado barbecuing as you please, in order to satisfy different appetites or tastes that can vary from one person to another.

A further object of the present invention is to provide such a structure of a portable cooking, toasting, roasting and carbonado barbecue heating device, of which the flame intensity can be effectively controlled by regulating the volume of gas and gas pressure admitted into the cooking or carbonado compartments thanks to the provision of a throttle valve therefor, so as to make possible the preparation of delicious foods differing in extent of exposure to the heating treatment as dependent upon the particular heating applied at the discretion of the cook. Also, the heater may help to cook various dishes served in any given type of boiler, cooker, or other culinary device.

Other features and advantages of the present invention will emerge from the following descriptions of embodiments given by way of illustration, but not in any way limiting, with reference to the accompanying drawings.

BRIEF DESCRIPTION OF DRAWINGS

FIG. 1 is an illustrative view of the invention seen in a three-dimensional setting;

FIG. 2 is a view of a knob provided to adjust the throttle valve and, therefore, the gas flow, according to the present invention;

FIG. 3 is a side view of a griddle pan, having firing holes provided, which are intercrossed by fins serving to conduct the incoming mixed fuel out of the firing holes;

FIG. 4 is a side view of a cooking burner in communication with a burning support provided underneath;

FIG. 5 is a view of a coulisse shaped roughly like the letter T, as provided inside the interior of both of the side lids provided underneath;

FIG. 9 is a general view of the invention including the gridwork, grill and griddle pan elevated to give a better understanding of the structural arrangement according to the invention.

DETAILED DESCRIPTION OF THE PREFERRED EMBODIMENT

Figure 6:
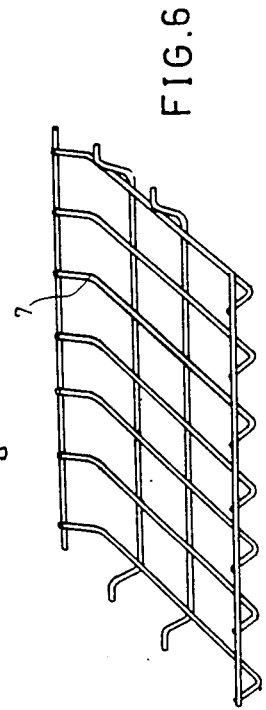
FIG. 6 is an overview of a carbonado grill to be supported by a griddle pan provided thereunder.

Referring first of all to FIG. 1 it will be seen that in the oven body 11, there is accommodated one set of heating units facilitating toasting, roasting, and cooking processes. The heating unit is accessed via a round hole on the oven body 11 through intake duct 21, and may be connected externally to a duct 92 linked with a fixing sheath 91 of a regular gas duct. One end of the intake duct 21 is interconnected with a guide duct 22, which is in turn linked to a throttle valve control 23, which is a three-way valve, like what is shown in FIG. 2, from which two paths 24, 25 are diverted out. The path 24 is connected to a mixing valve 26, which is screwed to a side lid of the oven body 11 by a fitting 112. The mixing valve 26 serves to combine both gas and air for composite feeding to tubular burner 31, over which there is provided a bearing pan 32 (FIG. 9) serving to give support to a grill 7, like what is shown in FIG. 6. By the side lid of the bearing pan 32, there are provided firing vents 33, each of them supplemented by little fins 34, like what is shown in FIG. 3, on a side remote to the gas feeding source and arranged approximately vertical to the side walls, serving to efficiently guide the combined gas as fed in, out of the firing vents 33, so that the fuel, on rushing out of the firing vents 33, can combust to assist the heating process.

The other outgoing path 25 (FIG. 2) is linked to a throttle valve control 27 instead, which is a two-way valve, from one end whereof there is extended a duct 28 to the burning receptacle 29. The throttle valves 23 and 28 are both regulated as to the flow by a knob 231, like what is shown in FIG. 2. The burning receptacle 29 may be helically associated with a cooking burner 4, like what is shown in FIG. 4. The burner 4 has a plurality of small holes 42 provided beneath the base tubing to facilitate adjusting of the air passage.

On the bottom inside of the oven body 11, there are provided two laterally symmetric fittings 113, 114 under the bearing pan 32, serving to uphold a toast tank 5 which is structured like a semi-cylinder, having an access hole 51 provided on one side thereof, to permit the mounting of the tubular burner 31, like what is shown in FIG. 9, the other side of the bearing pan 32 bearing upon a fitting member 52 (FIG. 9). In the central bottom of the oven body 11, there is provided a row of venting holes 115 for ventilation.

On the right side of the toast tank 5, there is furnished a flat facing 6. The center thereof is a burning compartment 61 whereupon a burner 4 may be placed. The flat facing 6 is supported over the four corners by four legs 62, on the right side of the flat facing 6, there are provided two round holes 63, serving to accommodate the insertion of the footings of an oblong gridwork 8, like what is shown in FIG. 9.

On either side of the oven body 11, there is provided siding 12 and 13. Under each of the two sidings, there are provided vertical bent legs 121,122 (FIG. 9) and 131, 132, movably mounted upon the side wall of the oven body 1 by the provision of two thoroughgoing snap fasteners. Inside both sidings 12 and 13, there are provided each a T shaped coulisse 123, like what is shown in FIG. 5, to be coupled by little fasteners 141 provided on both sides of the oven cover 14, by having the T shape lug 42 of the fastener 141 inserted by the front into the T shaped coulisse 123, then shifted ahead of the coulisse 123, so that both sidings 12, 13 may be united with the oven cover 14 and stand up right, like what is shown in FIG. 9. Furthermore, the underside of the oven cover 14 is integrated with the oven body 11 by two hinges 143, so that the oven cover 14 is movably mounted above the oven.

Figure 7:
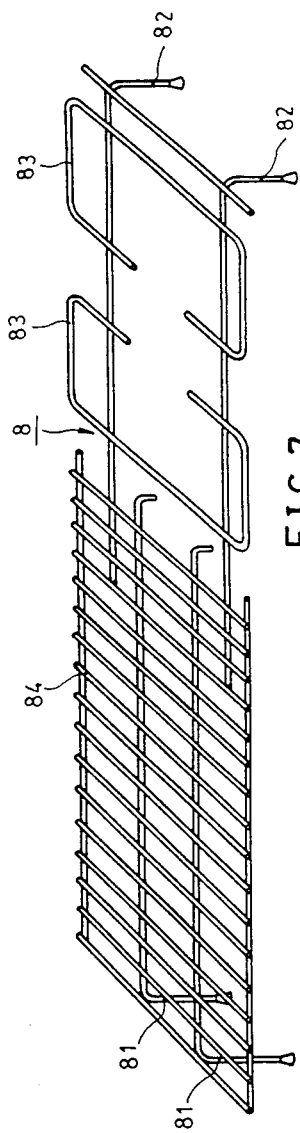
FIG. 7 is an oblong gridwork disposable above the carbonado grill thereunder.

In FIG. 9, there is illustrated another perspective view of the invention wherein the two sidings 12, 13 and the oven cover 14 are open and stand symmetrical laterally. This arrangement serves to prevent fluids or potage from spraying out when the food is being toasted, cooked, or otherwise processed. It is also permissible to skew the two sidings 12, 13 and the oven cover 14 outwardly, so that the three of them are held discrete from one another, but facing outward in a flat setting. A grill 7 (FIG. 6) has to be placed in the totast tank 5 (FIG. 1) and presented as a sunk frame, topped by an oblong gridwork 8, like what is shown in FIG. 7, the oblong gridwork having a footing 81, 82, integral with and under both extreimities thereof. The pair of footings 81 on the left side is arranged for insertion over the holes on the left side of the oven body 11, while the pair of footings 82 on the right side is established upon the oven body via holes 63 on the flat facing 6. The left side of the oblong gridwork 8 is presented as a gridwork in a suspended state to permit toasting or carbonadoing of foods, whereas the right side thereof is received in two holes 63. Thus, structured gridforms permit the placing of a boiler or a cooker therein for cooking purposes.

Figure 8:
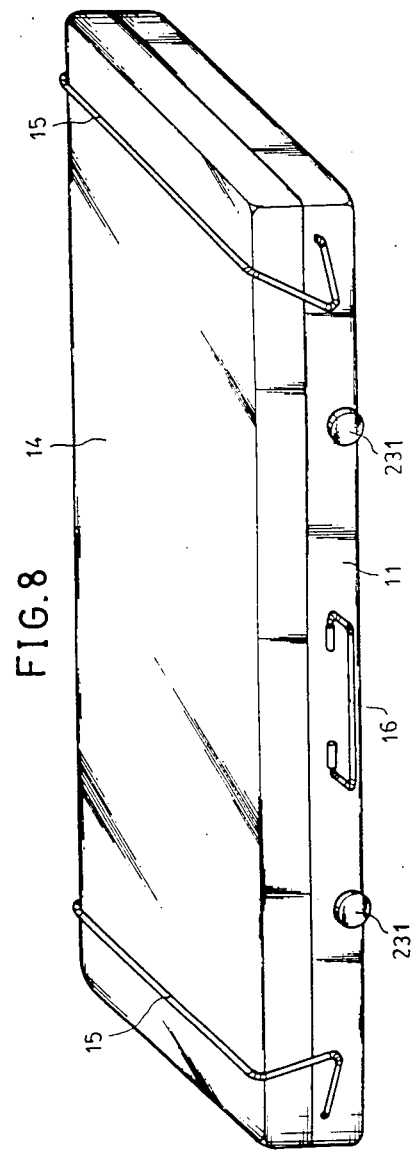
FIG. 8 is a general view of the oven cover turned in to cover up both of the side lids. Both snap limbs then pass thereover to lock up the unit, so that the oven and the cover, embodied together as such unit, may be carried along by holding a handle provided in the center of the oven hereunder described.

When it is intended to store the heating device, the gridwork 7 and the oblong grill 8 remain the way they are, that is, for placing them into the oven body 1, both sidings 12, 13 are turned in for covering up the flat facing 6 and the totast tank 5. Then, the oven cover 14 is turned inwards for covering over both sidings 12, 13, whereupon, by turning the snap fastener 15 on both sides of the oven in the upgoing direction, both the oven body 11 and the oven cover 14 will be brought together, so that you can carry the whole set along by holding your hand over the grip handle down the one side of the oven proper, like what is shown in FIG. 8. The snap fastener 15 in FIG. 9 serves as a footing for supports, but the one seen in FIG. 8 serves as a coupling instead.

The invention is very convenient for use and in application, it is easy to carry, without much space requirements, and easily accounts as an ideal utensil, indeed a walking cooking utensil for convenient preparation of foods of chosen style for people staying outdoors in a field for pleasure, for example in a tour, camping or bivouac activities.

I claim:

1. A portable device for cooking, toasting, roasting, and carbonado heating, comprising:
   an oven body having a bottom wall, two opposing side walls, a front wall, and a back wall, said bottom wall having a plurality of vent holes therethrough;
   an intake duct connected into one of the side walls of the oven body;
   a three-way throttle control valve means installed in the front wall of the oven body;
   a fuel guide duct connected between the intake duct and the control valve means;
   a mixing valve fixed into one of the side walls of the oven body;
   a first pipe extending from the control valve means to the mixing valve;

a first burner secured to the bottom wall of the oven body;
a second pipe extending from the control valve means to the burner;
a relatively flat facing plate provided around the burner;
a semicylindrical toasting tank fitted to the bottom wall of the oven body and having top edges;
a tubular burner secured at one end to the mixing valve and extending into the toasting tank;
a pan fitted inside the toasting tank and extending over the tubular burner;
a grill centrally sunk in the toasting tank and resting on the top edges of said toasting tank;
an oblong gridwork extending over both the grill and the facing plate;
two siding plates arranged above the two opposing side walls of the oven body;
a cover hinged to the back wall of the oven body;
fastener means, secured to both the two siding plates and the cover, for retaining the siding plates and the cover in a joined upstanding position;
a handle means, fixed to the front wall of the oven body, for carrying the portable device; and
snap fastener means, secured in and extending from the front wall to the back wall of the oven body, for serving as legs for the portable device in an open condition when the two siding plates and the cover are in the upstanding position and and for serving as securement means for retaining the portable device in a closed condition when the two siding plates and the cover are collapsed out of their upstanding position.

* * * * *